United States Patent [19]

Go et al.

[11] Patent Number: 5,275,765
[45] Date of Patent: Jan. 4, 1994

[54] METHOD OF MANUFACTURING AN OPTICAL MODULE USING A MOLD DIE

[75] Inventors: Hisao Go; Yutaka Matsumura, both of Kanagawa, Japan

[73] Assignee: Sumitomo Electric Industries, Ltd., Osaka, Japan

[21] Appl. No.: 824,102

[22] Filed: Jan. 22, 1992

[30] Foreign Application Priority Data

Jan. 23, 1991 [JP] Japan .................... 3-6232

[51] Int. Cl.⁵ .......................................... B29C 45/14
[52] U.S. Cl. ........................ 264/1.5; 264/263; 264/272.14; 264/272.15; 264/275; 264/279; 264/328.1; 385/70; 385/73
[58] Field of Search ............ 264/1.1, 1.5, 263, 272.14, 264/272.15, 275, 279, 328.1; 385/70, 73, 88, 90

[56] References Cited

U.S. PATENT DOCUMENTS

| | | |
|---|---|---|
| 2,500,546 | 3/1950 | Judisch . |
| 3,188,370 | 6/1965 | Gotzy ..................... 264/275 |
| 4,314,960 | 2/1982 | Hass ..................... 264/272.15 |
| 4,410,469 | 10/1983 | Katagiri et al. ............. 264/272.15 |
| 4,470,786 | 9/1984 | Sano et al. ............... 264/272.15 |
| 4,822,434 | 4/1989 | Sawaki et al. ............. 264/272.14 |
| 5,109,454 | 4/1992 | Okuno et al. ............... 385/89 |
| 5,127,071 | 6/1992 | Go ............................. 385/73 |
| 5,165,002 | 11/1992 | Cumberledge et al. ....... 385/88 |
| 5,170,453 | 12/1992 | Go et al. ..................... 385/70 |

FOREIGN PATENT DOCUMENTS

| | | |
|---|---|---|
| 2166396 | 6/1971 | Fed. Rep. of Germany . |
| 57-208227 | 12/1982 | Japan . |
| 58-203009 | 11/1983 | Japan . |
| 60-71220 | 4/1985 | Japan . |
| 1-169936 | 7/1989 | Japan . |
| 2-278212 | 11/1990 | Japan . |
| 617658 | 10/1946 | United Kingdom . |
| 1189904 | 4/1970 | United Kingdom . |
| 1353603 | 5/1970 | United Kingdom . |

*Primary Examiner*—Jeffery Thurlow
*Assistant Examiner*—Mathieu Vargot
*Attorney, Agent, or Firm*—Cushman, Darby & Cushman

[57] ABSTRACT

A method of manufacture of an optical module using a mold die including cavity portions for holding an optical connector, electronic circuit parts, and lead pins which constitute component parts of the optical module, so as to form a package. The mold die has alignment portions in which rectangular channels for aligning the optical connector are formed. Partition plates are disposed vertically between the cavity portions and the alignment portions and adapted to prevent a resin from flowing out from the cavity portions during the resin molding. An optical connector, circuit parts, and lead pins are held in the die. Resin is injected into the cavity portion to form the optical module.

8 Claims, 10 Drawing Sheets

METHOD OF MANUFACTURING AN OPTICAL MODULE USING A MOLD DIE

BACKGROUND OF THE INVENTION

The present invention relates to a mold die for manufacturing an optical module for integrally holding component parts such as optical connectors, optical operation elements, and electronic circuit parts by a molding resin, and manufacturing method using the mold die.

In manufacturing an optical module by transfer molding using a molding resin, the longitudinal accuracy, positional accuracy, and angular accuracy of an optical connector relative to its package are important. Furthermore, in manufacturing a multicore optical module having a plurality of optical connectors, it is necessary to ensure sufficient positional accuracy (pitch and parallelism) among the optical connectors. Conventionally, the optical module is manufactured as following process.

First, electronic circuit parts such as bare chips are mounted on a substrate on which a wiring pattern formed by die bonding or the like. Furthermore, the electronic circuit constituted by the electronic circuit parts mounted on the substrate is connected to an inner lead or an optical operation element, such as a light-emitting element or a light-receiving element, fixed to a connector. An assembly thus formed is then placed in a transfer mold, and is subjected to resin molding so as to be formed as a unit. Subsequently, unnecessary portions of a lead frame are removed and lead pins are bent, hence completing an optical module.

Figure 17:
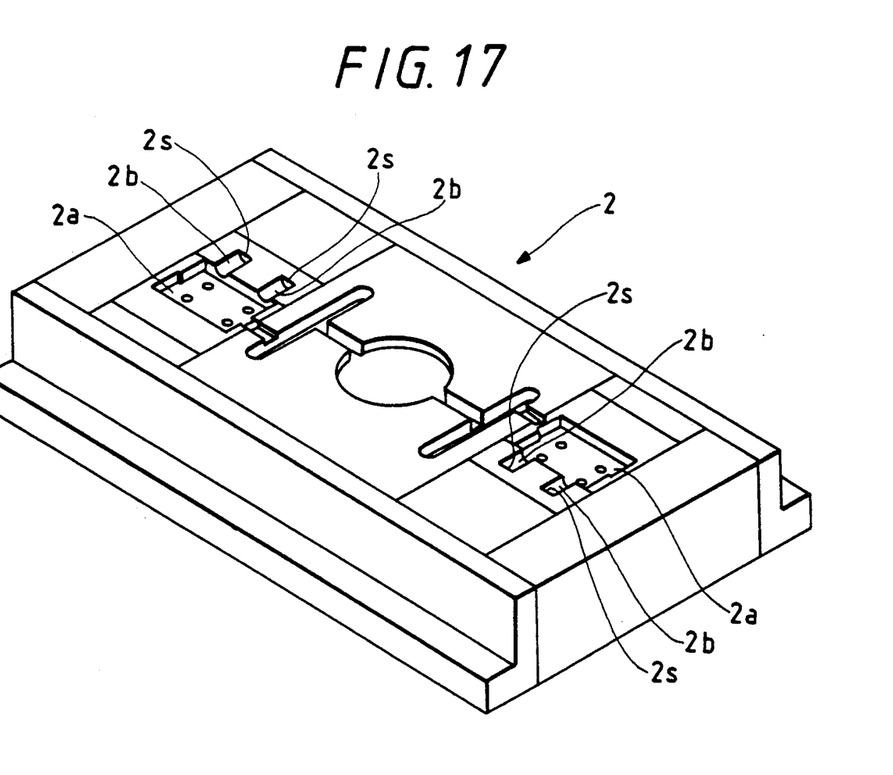
FIG. 17 is a perspective view illustrating a lower die of a transfer mold die conventionally used.
Figure 18:
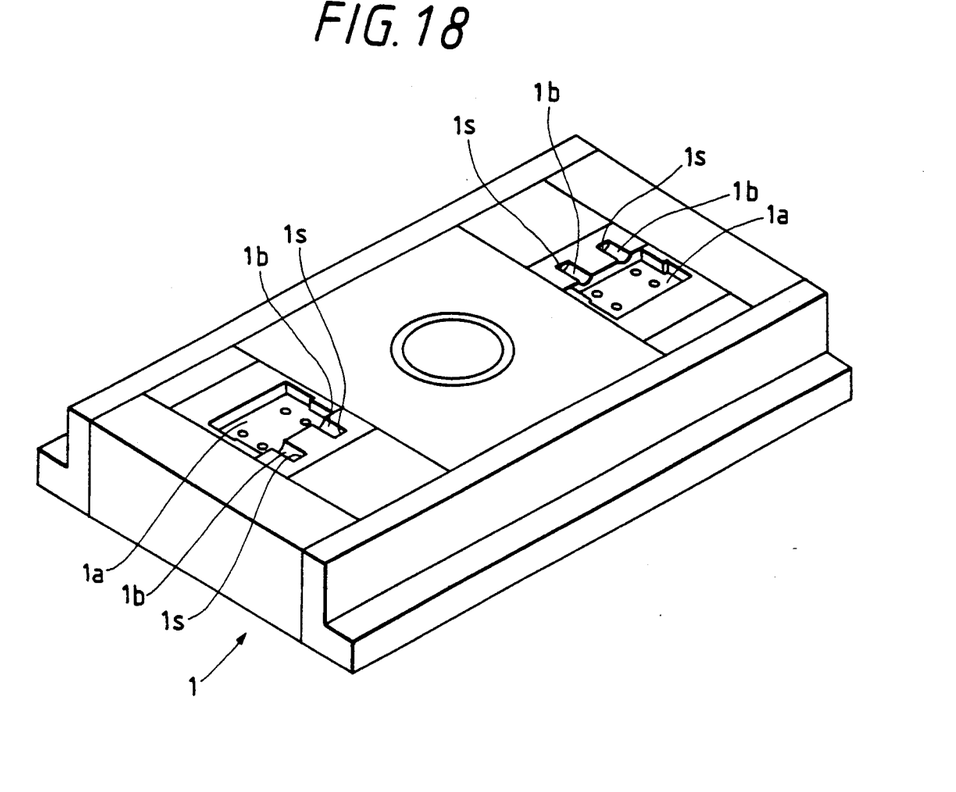
FIG. 18 is a perspective view illustrating an upper die of a transfer mold die conventionally used.

FIGS. 17 and 18 are perspective views illustrating a transfer mold die used for manufacturing a conventional multicore optical module. This mold die comprises an upper die 1 (FIG. 18) and a lower die 2 (FIG. 17), and two cavities 1a, 2a are formed on mutually opposing surfaces of the upper die 1 and the lower die 2. A pair of semicylindrical concave portions 1b, 2b are formed in communication with the respective cavities 1a, 2a. The component parts such as the lead frame are placed between the upper die 1 and the lower die 2 and, in this case, one end side of the optical connector for receiving an end of an optical fiber is adapted to be fitted closely into the concave portions 1b, 2b. As a pair of optical connectors are fitted in these concave portions 1b, 2b, the relative positional relationship between the optical connectors is determined.

Figure 19:
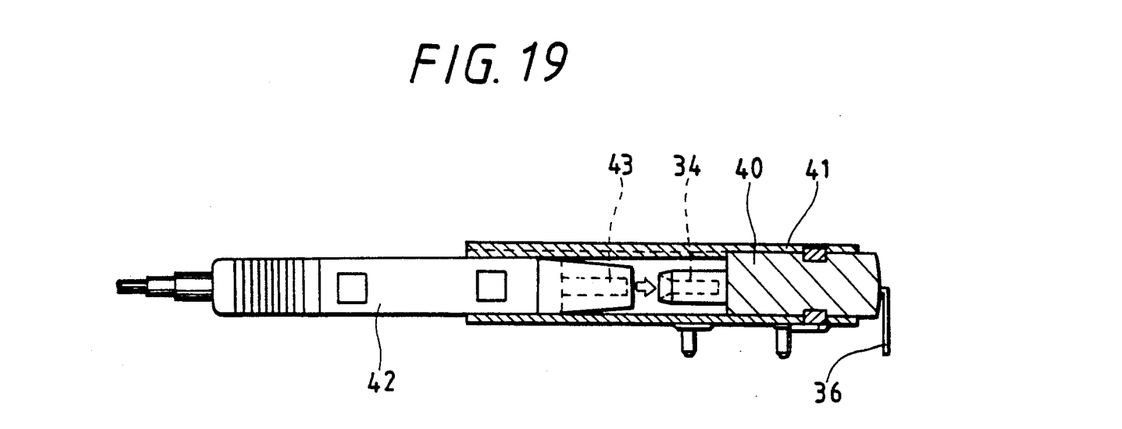
FIG. 19 is a cross-sectional view illustrating a state in which the optical module is connected to an optical plug via a receptacle.

FIG. 19 is a cross-sectional view illustrating a state in which the optical module formed by transfer molding described above is connected to an optical plug via a receptacle. Here, an optical module 40 is inserted into one end portion of a receptacle 41, while an optical plug 42 having a ferrule 43 is inserted into the other end portion of the receptacle 41. Thus, an optical coupling is established between the optical fiber held by the ferrule 43 and an optical operation element fixed to an optical connector 34. At this juncture, as the optical module 40 is secured by the one end portion of the receptacle 41, the position of the optical connector 34 in the longitudinal direction and in a direction perpendicular thereto is determined at the one end portion of the receptacle 41. Meanwhile, as for the optical plug 42, the position of the ferrule 43 in the longitudinal direction and in a direction perpendicular thereto is determined at the other end portion. Accordingly, in order to position the optical connector 34 and the ferrule 43 with in the receptacle 41 with high accuracy, it is necessary to ensure the positional accuracy and angular accuracy of the optical connector 34 with respect to the outer peripheral dimensions of a package portion of the optical module 40. Unless these accuracies are ensured, the ferrule 43 partially abuts against the optical connector at the time of attachment and detachment of the optical plug, so that the abrasion, breakage, and the like of the ferrule and the interior of the optical connector occur.

In addition, if the pin length (the length of the optical connector projecting from a resin portion) of the resin-molded optical connector 34 is inaccurate, it becomes impossible to effect an adequate optical coupling, or in a case where the pin length has become extremely short, a stress is applied to a wire connecting the optical connector and the circuit, which is therefore undesirable. For this reason, it is necessary to accurately position the optical connector at the time of resin molding.

According to a conventional method of manufacturing an optical module, stopper surfaces 1s, 2s are provided for the concave portions 1b, 2b of the mold die in which the optical connector is secured, with respect to the direction in which the optical connector moves away from the cavities 1a, 2a in the longitudinal direction (in the axial direction of the optical connector) of the concave portions 1b, 2b. However, no restrictions have been provided with respect to the direction in which the optical connector approaches the cavities 1a, 2a. For that reason, if the optical connector moves due to vibrations or the like at the time of aligning the upper die 1 to the lower die 2 of the mold die, there is the possibility that the optical module is formed in a state in which the optical connector is located closer to the cavities 1a, 2a from its predetermined position, thereby shortening the pin length of the optical connector projecting from the molding resin member.

In addition, the optical modules have hitherto been manufactured by using a mold die having semicircular alignment channels, and the semicircular alignment channels have been formed by drilling. Therefore, there have been drawbacks in that it is difficult to control the machining depth of the alignment channels and prevent the inclination of the axis owing to variations in the run-out of the drill between the top portion and the proximal portion of the drill during rotation, and that sagging is liable to occur to an edge of a machining portion. Hence, there have been limitations to the ensuring of the positional accuracy and angular accuracy of the optical connector.

SUMMARY OF THE INVENTION

Accordingly, the object of the present invention is to manufacture an optical module in which an optical connector is positioned with high accuracy.

To attain the above-described object, in accordance with the present invention, an optical module is manufactured by using a mold die including a cavity portion for holding an optical connector, electronic circuit parts, and a lead pin which constitute component parts of the optical module, so as to form a package; an alignment portion in which a channel for aligning the optical connector is formed; and a partition plate disposed between the cavity portion and the alignment portion to prevent a resin from flowing out from the cavity portion to the alignment portion during the resin molding.

In addition, the optical module is manufactured by using a mold die including first positioning means formed in the channel of the alignment portion to engage an engaging portion formed on an outer peripheral portion of the optical connector, the first positioning means being adapted to prevent the optical connector from moving within the channel in a longitudinal direction thereof.

Furthermore, the optical module is manufactured by using a mold die including second positioning means adapted to prevent the optical connector from moving with in the channel in a direction perpendicular to a longitudinal direction thereof as the optical connector is pressed by a pin member.

Since the partition plate is provided in the mold die, the resin is prevented from flowing out from the cavity, and the configuration of the channel in the alignment portion may be various. For that reason, the control of the machining depth of the alignment channel is facilitated, and the inclination of the axis is prevented.

In addition, since the mold die is provided with the first positioning means, the optical connector, when fitted in the mold die, is secured in its longitudinal direction (in a back-and-forth direction), and its deviation in the longitudinal direction is prevented.

Moreover, since the mold die is provided with the second positioning means, the optical connector, when fitted in the mold, is pressed against a surface forming the alignment portion. Accordingly, the deviation in the angular direction is restrained.

DESCRIPTION OF THE PREFERRED EMBODIMENTS

Referring now to the accompanying drawings, the embodiments of the present invention will be described. In the description, the same reference numerals will be used for the same elements, and a repetition description will be omitted.

Figure 1:
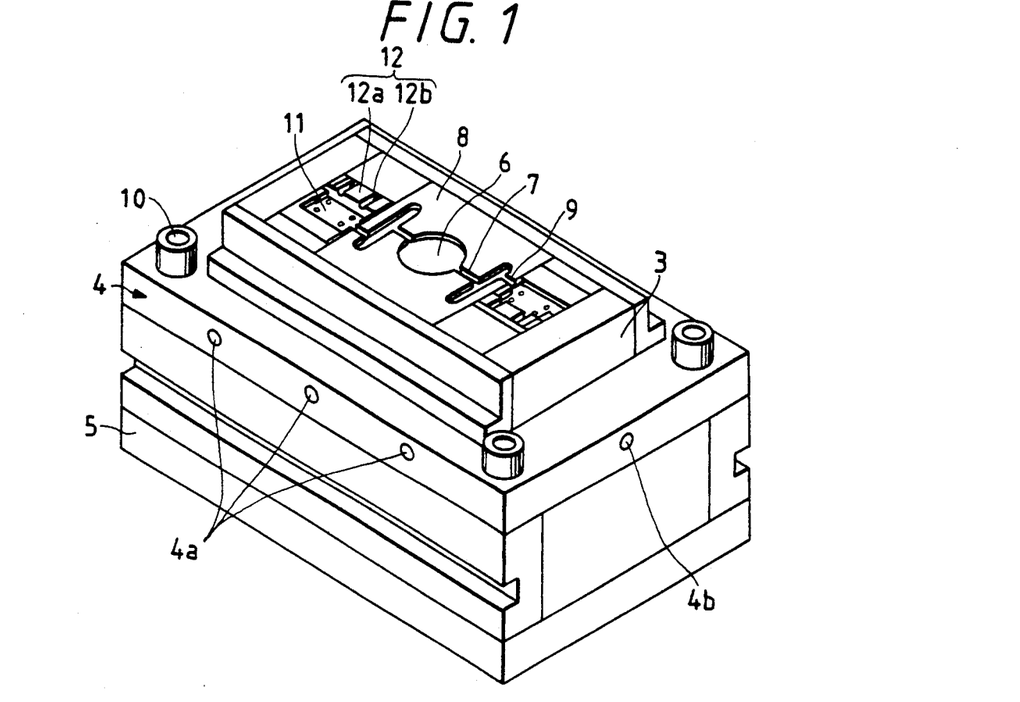
FIG. 1 is a perspective view illustrating a lower die used in the present invention.
Figure 2:
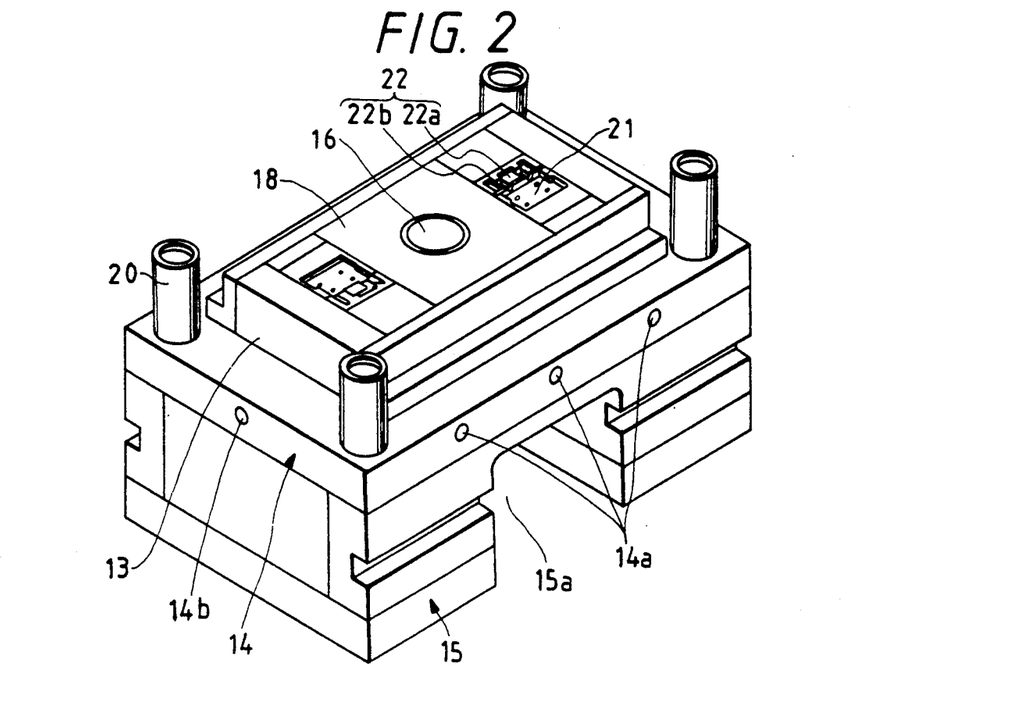
FIG. 2 is a perspective view illustrating an upper die used in the present invention.

First embodiment of the present invention will be described with reference to FIGS. 1-10. FIG. 1 is a perspective view illustrating a lower die of a conventional mold used with this embodiment, and FIG. 2 is a perspective view illustrating an upper die. The conventional mold is used by being directly mounted in a molding machine. According to the present invention, an optical module is manufactured by resin molding using the aforementioned mold.

Hereinafter, the mold die will be described in detail. The lower die comprises a lower chase 3, a lower heat platen 4, a heat-insulating plate 5, and posts 10. The lower chase 3 includes a cull portion 6, runners 7, a lower parting face 8, gates 9, lower cavities 11, and lower alignment portions 12. Heater insertion ports 4a and thermocouple insertion ports 4b are formed in the lower heat platen 4, and each lower alignment portion 12 includes lower flat surface portions 12a and lower alignment channels 12b. Meanwhile, the upper die comprises an upper chase 13, an upper heat platen 14, a heat-insulating plate 15, and post guides 20. The upper chase 13 includes a pot 16, an upper parting face 18, upper cavities 21, and upper alignment portions 22. Heater insertion ports 14a and thermocouple insertion ports 14b are formed in the upper platen 14, and each upper alignment portion 22 includes upper flat portions 22a and upper alignment channels 22b. In addition, a resin charging port 15a is provided in the heat-insulating plate 15. The upper die and the lower die are respectively attached to a platen and a crown of a transfer molding machine in such a manner that the respective parting faces oppose each other, and the upper die and the lower die are clamped at the time of resin molding, so that the parting faces abut against each other.

Figure 3:
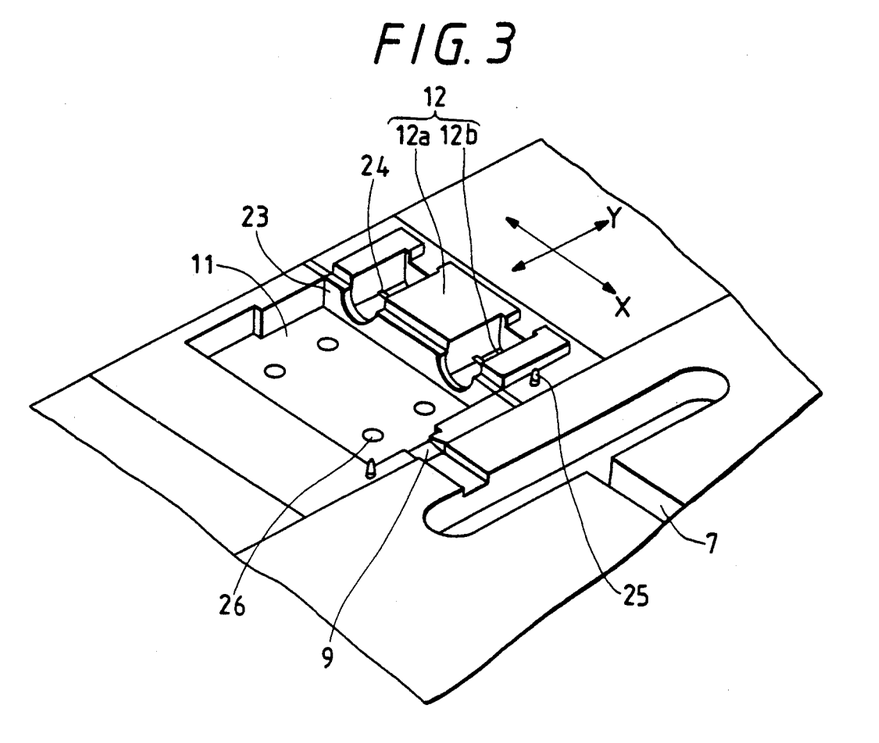
FIG. 3 is an enlarged perspective view of essential portions of the lower die used in the first embodiment.
Figure 4:
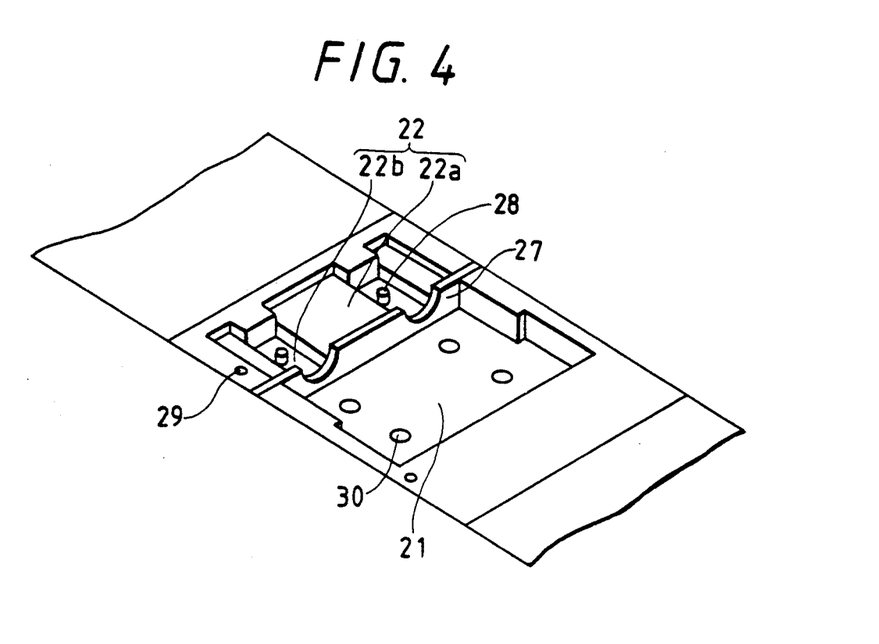
FIG. 4 is an enlarged perspective view of essential portions of the upper die used in the first embodiment.
Figure 5:
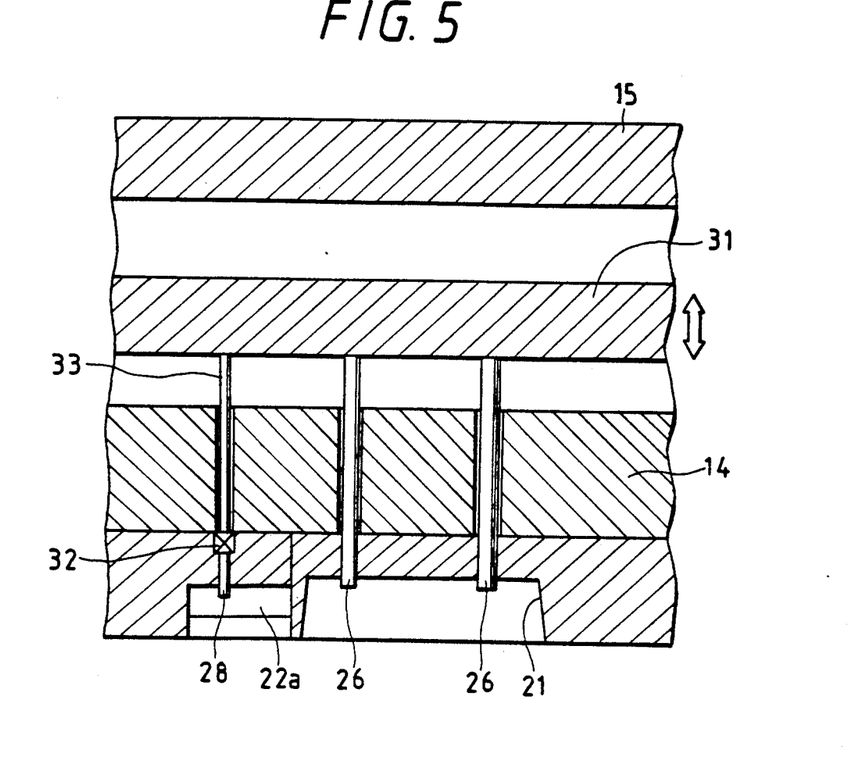
FIG. 5 is an enlarged cross-sectional view of an upper cavity and an upper alignment channel in the upper die used in the first embodiment.

Referring now to FIGS. 3-5, essential portions including the cavities and the alignment portions will be described. FIG. 3 is an enlarged perspective view of the essential portions of the lower die, FIG. 4 is an enlarged perspective view of the essential portions of the upper die, and FIG. 5 is an enlarged cross-sectional view of peripheral portions of the upper cavity 21 of the upper die. A partition plate 23 is disposed between the lower cavity 11 and the lower alignment portion 12, and a stopper member (a first positioning means) 24 is formed in each lower alignment channel 12b. Semicircular notched portions each having a radius of curvature slightly larger than the outer configuration of the optical connector are formed in the partition plate 23. Pilot pins 25 for positioning of a lead frame to the lower die are formed on opposite sides about the gate 9. Ejector pins 26 for removing a resin-molded package are disposed in the lower die 11. Meanwhile, a partition plate 27 is disposed between the upper cavity 21 and the upper alignment portion 22, and a positioning pin (a second positioning means) 28 is disposed in each upper alignment channel 22b. Semicircular notched portions each having a radius of curvature slightly larger than the outer configuration of the optical connector are formed in the partition plate 27. In addition, pin holes 29 into which the pilot pins 25 of the lower die are fitted are formed on opposite sides about the partition plate 27, and ejector pins 30 for removing the package from the upper die are disposed in the upper cavity 21. As shown in FIG. 5, a liftable ejector plate 31 is disposed between the upper heat platen 14 and the heat-insulating plate 15, and the ejector pins 26 are connected to this ejector plate 31. In addition, a relay pin 33 connected to the ejector plate 31 via a compression coil spring 32 is fixed to the positioning pin 28. Consequently, when the ejector plate 31 is lowered after resin molding, and the molded package is pushed out of the upper die by the ejector pins 26, the relay pins 33 forcibly press the positioning pins 28.

If optical modules are manufactured over extended periods of time by using the upper die having the positioning pins 28, gases generated from the molding resin come to adhere to the positioning pins 28 and, hence, there is the possibility that the positioning pins 28 fail to slide smoothly or fail to function properly. However, in this embodiment, as shown in FIG. 5, the structure provided is such that the relay pins 33 are connected to the positioning pins 28, and the positioning pins 28 are forcibly pushed out as the ejector plate 31 is lowered. Accordingly, the positioning pins 28 are pushed out on each occasion of resin molding, so that the satisfactory sliding characteristic of the positioning pins is maintained over extended periods of time.

Figure 6:
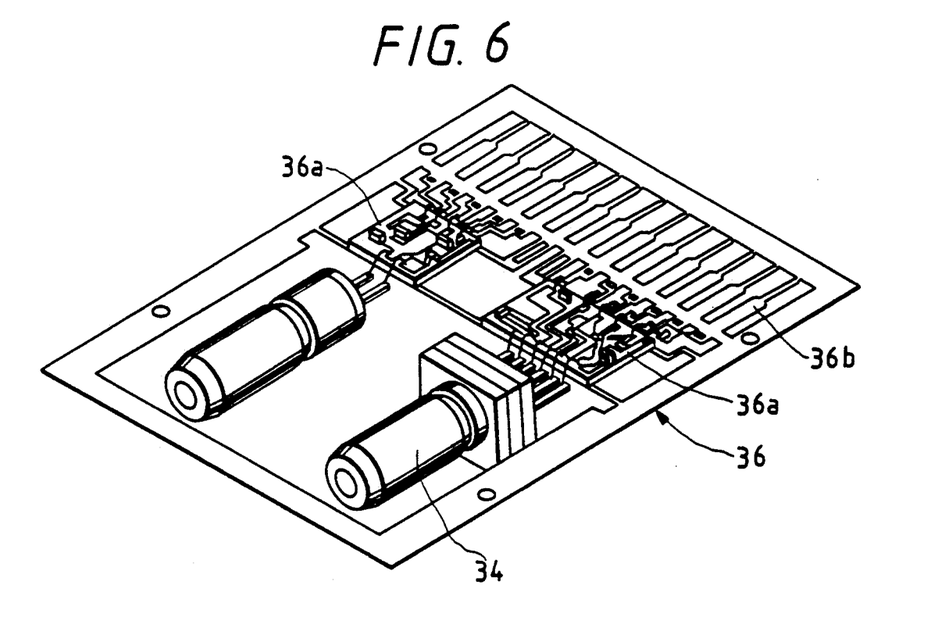
FIG. 6 is a perspective view illustrating a state in which electronic circuit parts and optical connectors are mounted prior to resin molding.

FIG. 6 is a perspective view illustrating a state in which electronic circuit parts and optical connectors are mounted prior to resin molding. The electronic circuit parts are mounted on two substrate portions 36a of a lead frame 36, and an electronic circuit constituted by these electronic circuit parts is connected to an optical operation element fixed to an optical connector 34.

Figure 7:
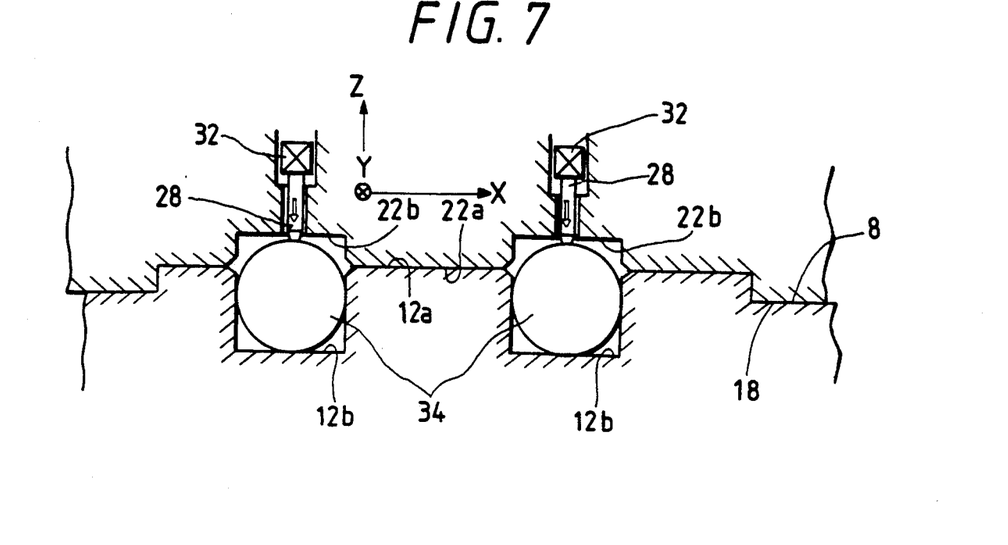
FIG. 7 is an enlarged cross-sectional view of the optical connectors in a state in which they are assembled between an upper die and a lower die.
Figure 8:
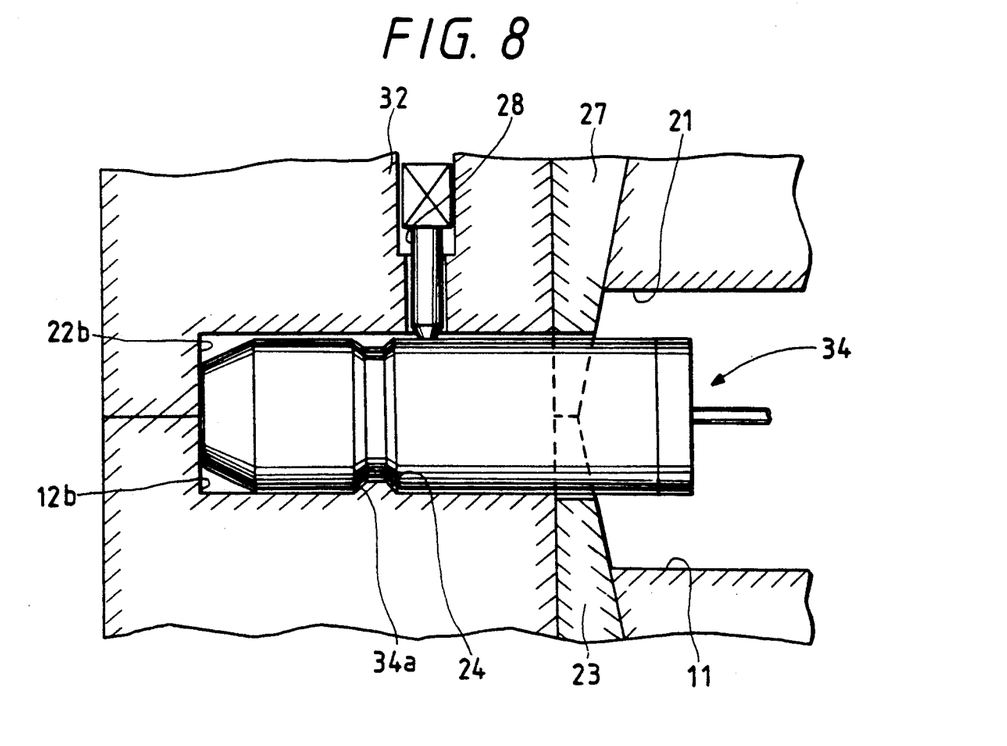
FIG. 8 is an enlarged sectional side view of the o optical connector in the state in which it is assembled between the upper die and the lower die.

FIG. 7 is an enlarged cross-sectional view of the optical connectors in a state in which they are assembled between the upper die and the lower die, the view being taken from the longitudinal direction of the optical connectors. FIG. 8 is an enlarged view of the optical connector in the state in which it is assembled between the upper die and the lower die, the view being taken from a direction perpendicular to the longitudinal direction. Each optical connector 34 is secured in an area having a rectangular cross-section formed by the lower alignment channel 12b and the upper alignment channel 22b. Here, the lower flat portion 12a is higher than the lower parting face 8 such that the central axis of the optical connector 34 is not included in a plane of extension of the lower flat surface portion 12a. This is ascribable to the following reason: Although the positional deviation in the X-direction and angular deviation of the optical connector 34 are virtually determined by the widths of the alignment channels 12b, 22b and the accuracy of the outside diameter of the optical connector 34, if, for instance, the height of the lower flat surface portion 12a and that of the lower parting face 8 are equal, and the alignment channels 12b, 22b are provided with chamfering for facilitating the mounting of the optical connector 34 therein, a clearance between the alignment channels 12b, 22b and the optical connector 34 becomes large due to the chamfering, thereby aggravating the positional accuracy and angular accuracy. In addition, since the optical connector 34 is disposed by being pressed against the lower surface of the lower alignment channel 12b by the positioning pin 28, the ensuring of the positional accuracy and angular accuracy is facilitated. Furthermore, since the stopper member 24 is fitted in a slit 34a formed on an outer periphery of the optical connector 34, the optical connector 34 is longitudinally positioned in the alignment channels 12b, 22b.

In addition, although in this embodiment the configuration of each alignment channel 12b, 22b is that of a rectangular channel, since the partition plates 23, 27 are formed, as shown in FIGS. 3 and 4, the resin is prevented from flowing out into the alignment channels 12b, 22b from the cavities 11, 21 at the time of resin molding.

Figure 9:
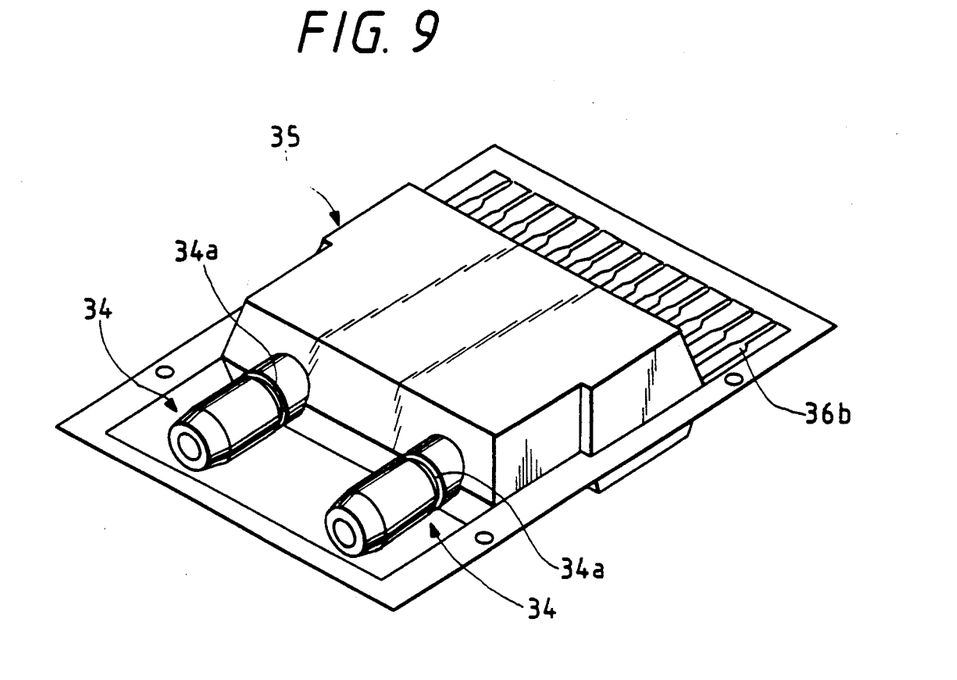
FIG. 9 is a perspective view illustrating a state in which a lead frame of the optical module has not been trimmed.
Figure 10:
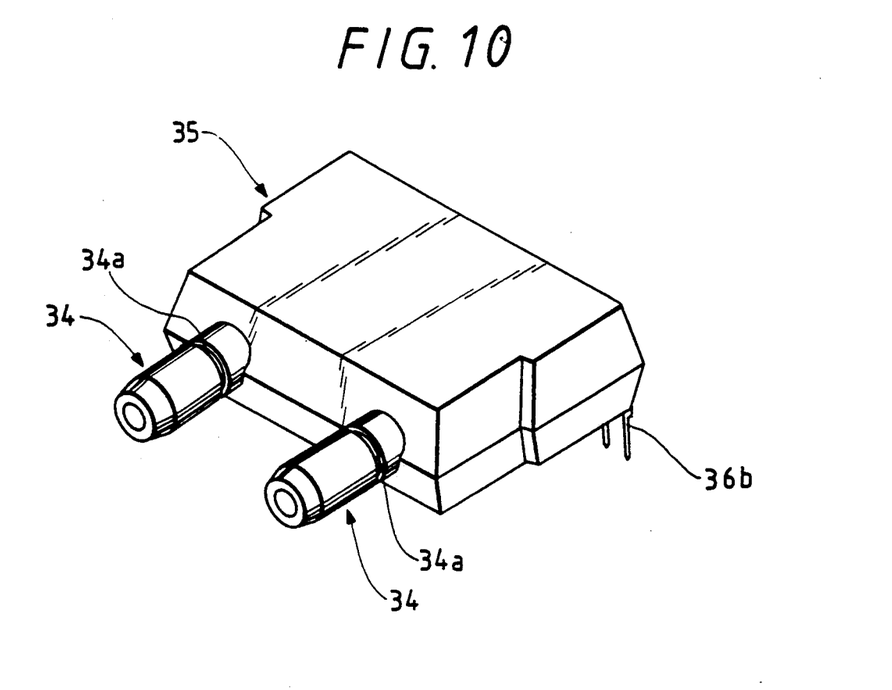
FIG. 10 is a perspective view illustrating a state in which unnecessary portions of the lead frame have been removed and lead pins have been bent.

FIG. 9 is a perspective view illustrating a state in which the lead frame of the optical module molded by using the above-described upper die and lower die has not been trimmed. FIG. 10 is a perspective view illustrating a state in which unnecessary portions of the lead frame 36 have been removed and the lead pins have been bent. The optical module includes a package portion 35 in which the electronic circuit parts and substrates are integrally held with a resin member, and distal ends of the optical connectors 34 and portions of lead pins 36b are exposed from a front and a rear portion of the package portion 35. The slit 34a is formed around the outer periphery of the optical connector 34, and this slit 34a is engaged with the aforementioned stopper member 24 at the time of resin molding, thereby effecting the relative positioning of the optical connectors 34 and the package portion 35. Therefore, the pin lengths of the two optical connectors are set to be equal with high accuracy.

Thus, according to the first embodiment, the longitudinal deviation of the optical connectors 34 with respect to the package portion 35 can be prevented positively, so that it is possible to fabricate an optical module with extremely accurate pin length.

In addition, since rectangular channels facilitating high-accuracy machining are used as the alignment channels 12b, 22b of the mold, and the partition plates 23, 27 are juxtaposed, the positional accuracy and angular accuracy of the optical connectors 34 are improved.

Figure 11:
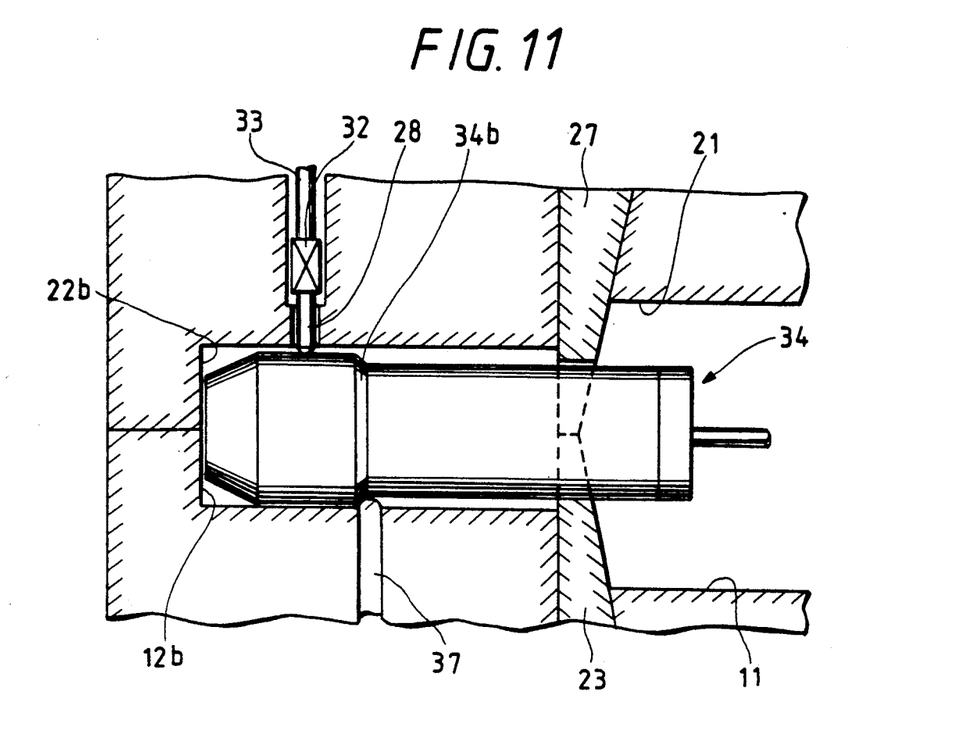
FIG. 11 is an enlarged cross-sectional side view of the second embodiment.

Referring now to FIG. 11, a second embodiment of the present invention will be described. FIG. 11 is an enlarged cross-sectional view of the alignment channels 12b, 22b and their peripheral portions in accordance with the second embodiment. The difference with the first embodiment lies in that a stopper pin 37 for engaging an inclined portion 34b formed on the outer periphery of the optical connector 34 is provided as the first positioning means. In this case, the optical connector 34 is pressed against the front surfaces of the alignment channels 12b, 22b by means of an axial component of a force applied to the inclined portion 34b, thereby preventing the positional deviation of the optical connector 34 in the longitudinal direction. It should be noted that although the stopper pin 37 is disposed on the lower surface of the lower alignment channel 12b, the stopper pin 37 may be disposed on a side surface of the lower alignment channel or the upper alignment channel 22b.

Figure 12A:
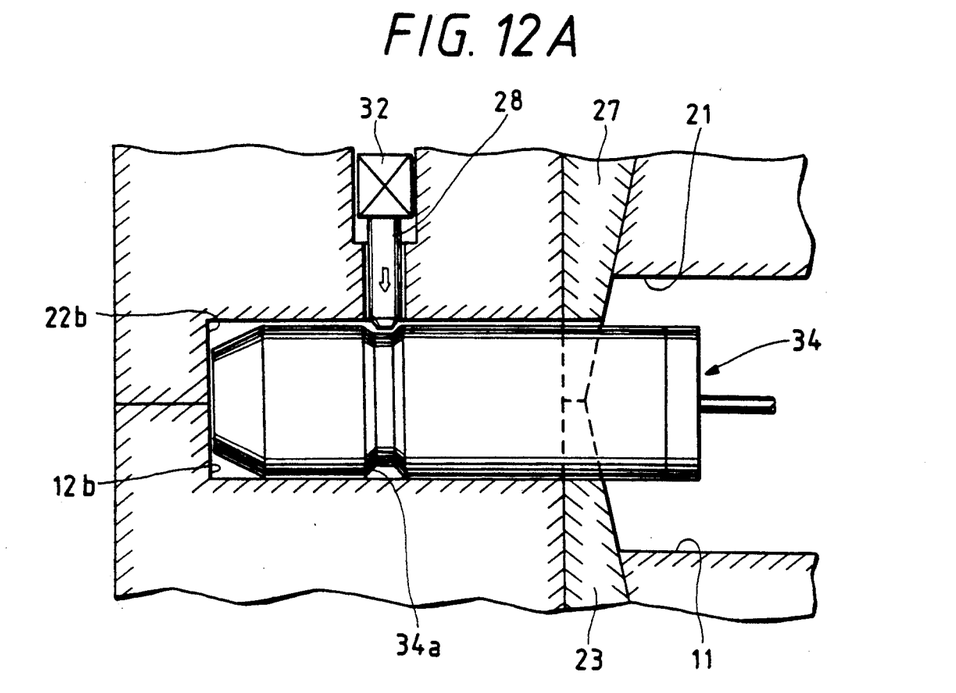
FIGS. 12A and 12B are an enlarged cross-sectional side view of the third embodiment.
Figure 12B:
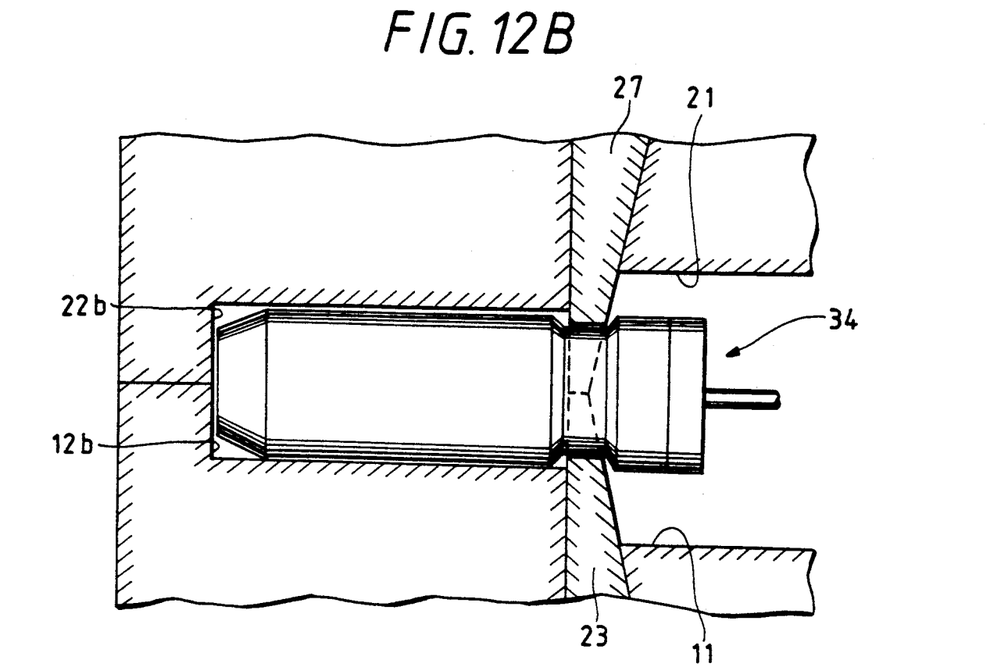

Referring now to FIGS. 12A and 12B, a third embodiment of the present invention will be described. FIG. 12A is an enlarged cross-sectional view of the alignment channels 12b, 22b and their peripheral portions in accordance with the third embodiment. The difference with the first embodiment lies in that as the positioning pin 28 is engaged with the slit 34a formed around the outer periphery of the optical connector 34, the positioning pin 28 is provided with both functions of the first positioning means and the second positioning means. Accordingly, the stopper members 24 (shown in FIG. 3) become unnecessary, so that the number of component parts of the mold decreases. Since the basic structure of the positioning pin 28 has been described before, a description thereof will be omitted. In addition, instead of using the positioning pin 28, these functions of the first positioning means ma be provided by allowing ends of the partition plates 23, 27 to engage the slit 34a of the optical connector 34 as shown in FIG. 12B.

Figure 13:
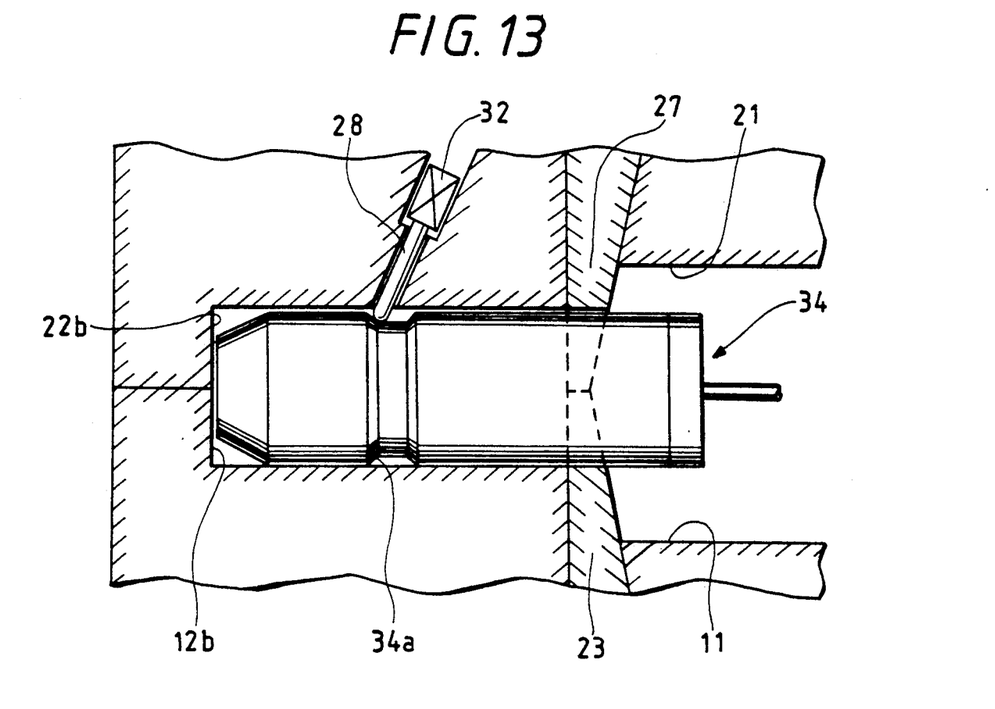
FIG. 13 is an enlarged cross-sectional side view of fourth embodiment.

Referring now to FIG. 13, a fourth embodiment of the present invention will be described. FIG. 13 is an enlarged cross-sectional view of the alignment channels 12b, 22b and their peripheral portions in accordance with the fourth embodiment. The difference with the first embodiment lies in that the optical connector 34 is pressed against the front surfaces of the alignment channels 12b, 22b as the positioning pin 28 is pressed against an inclined surface, located on the side of the distal end of the pin, of the slit 34a of the optical connector 34 with the positioning pin inclined toward the cavity. In this case, the positioning pin 28 is identical with that of the third embodiment in that it is provided with both functions of the first positioning means and the second positioning means, but the accuracy of the pin length improves remarkably since the optical connector 34 is pressed against the front surfaces of the alignment channels 12b, 22b.

Figure 14:
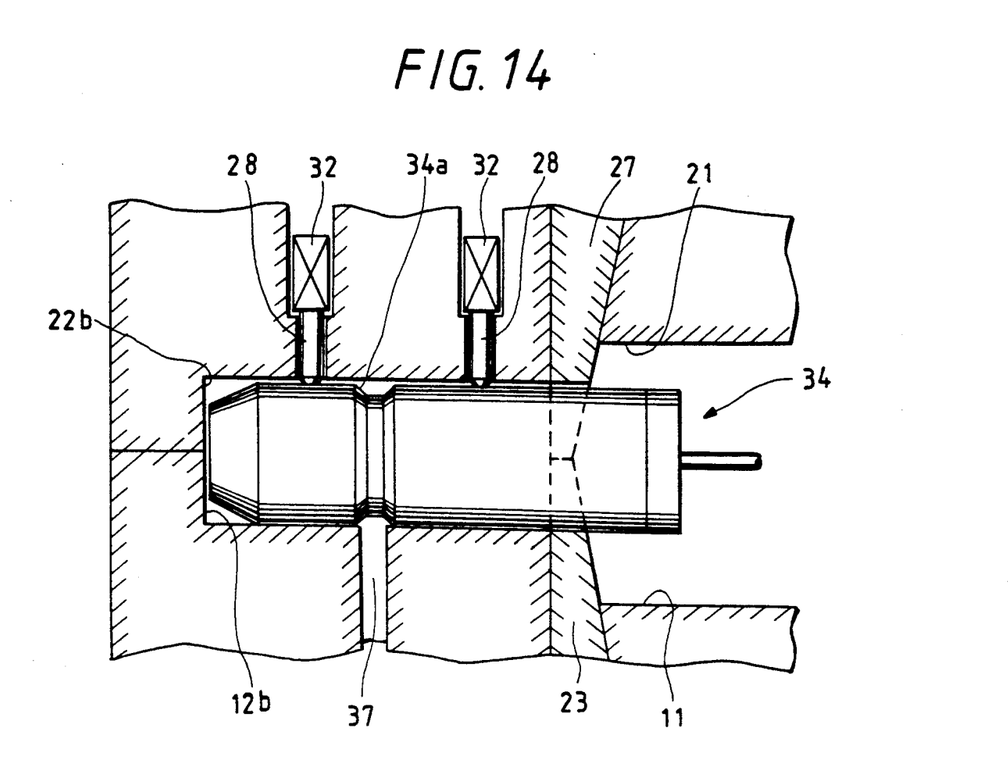
FIG. 14 is an enlarged cross-sectional side view of the fifth embodiment.

Referring now to FIG. 14, a fifth embodiment of the present invention will be described. FIG. 14 is an enlarged cross-sectional view of the alignment channels 12b, 22b and their peripheral portions in accordance with the fifth embodiment. The difference with the first embodiment lies in that two positioning pin 28 are used. For this reason, it is possible to reliably prevent an angular deviation in the vertical direction. It should be noted that the number of the pins may be three or more.

Figure 15:
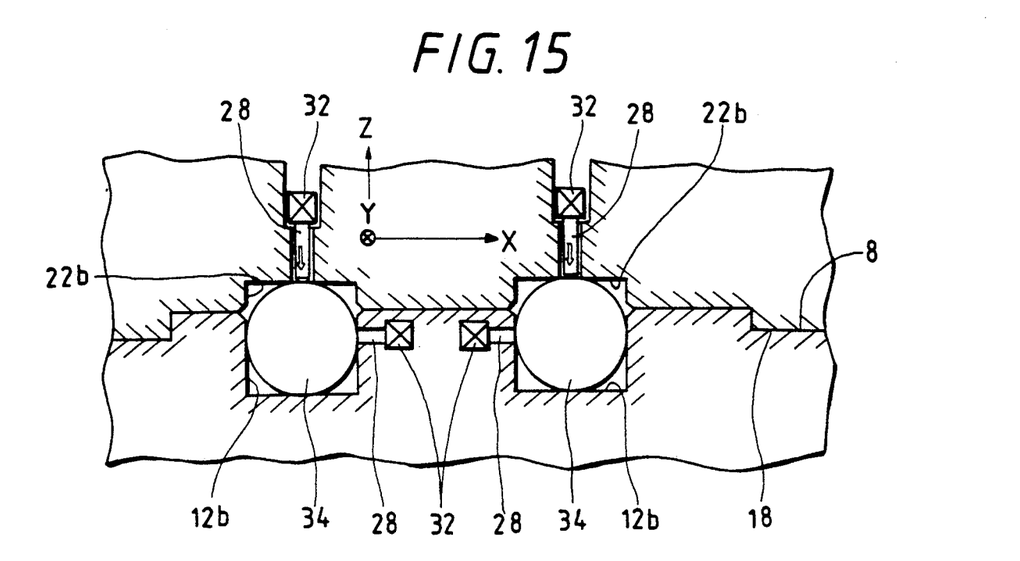
FIG. 15 is an enlarged cross-sectional view of the sixth embodiment.

Referring now to FIG. 15, a sixth embodiment of the present invention will be described. FIG. 15 is an enlarged cross-sectional view of the alignment channels 12b, 22b and their peripheral portions in accordance with the sixth embodiment. The difference with the first embodiment lies in that the positioning pins 28 are disposed not only in Z (vertical) direction but in X (horizontal) direction. For this reason, the positional accuracy and angular accuracy of the optical module in the X and Z directions are improved remarkably.

Figure 16:
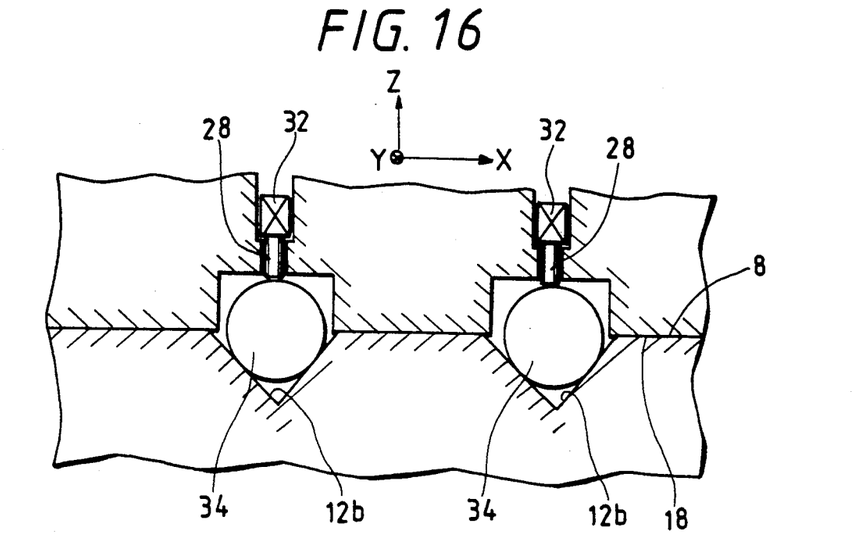
FIG. 16 is an enlarged cross-sectional view of the seventh embodiment.

Referring now to FIG. 16, a seventh embodiment of the present invention will be described. FIG. 16 is an enlarged cross-sectional view of the alignment channels 12b, 22b and their peripheral portions in accordance with the seventh embodiment. The difference with the first embodiment lies in that the configuration of the lower alignment channel 12b is formed into a V-channel. For this reason, the accuracy in the directions of X and Z can be ensured by means of the positioning pin 28 disposed in the direction of Z. The configuration of the rectangular channel may be a polygon other than a rectangular channel and a V-channel.

It should be noted that the present invention is not restricted other above-described embodiments. Although in the above-described embodiments a description has been given of a method of manufacturing a two-core optical module as an example, it goes without saying that the present invention is applicable to a multi-core optical module other than the two-core module and to a single-core optical module.

In addition, although in the above-described embodiments a description has been given of a conventional mold which is used by being directly mounted in a molding machine, the present invention is applicable to a hand mold which is used by being separated from a molding machine.

Furthermore, although in the above-described embodiments a slit or a recessed portion such as a stepped portion is provided around the outer periphery of the optical connector, and a protruding stopper portion is provided in the mold, the protruding portion may conversely be provided on the outer periphery of the optical connector, and the recessed portion for engaging the same may be provided in the alignment channel of the mold.

Since the present invention is arranged as described above, it is possible to readily manufacture optical modules having high accuracy in terms of the projecting length, position, and angle of the optical connector.

What is claimed is:

1. A method of manufacturing an optical module having an optical connector including an optical operation element, electronic circuit parts, and at least one lead pin comprising the steps of:

placing the optical connector, electronic circuit parts, and at least one lead pin in a mold die, the mold die comprising:

a cavity portion for holding the optical connector, electronic circuit parts, and at least one lead pin so as to form a package;

an alignment portion having a channel for aligning the optical connector, the channel having a positioning means for positioning the optical connector within the channel; and a partition plate disposed between the cavity portion and the alignment portion to prevent resin from flowing out from the cavity portion to the alignment portion;

holding a portion of the optical connector in the channel;

holding a portion of the at least one lead pin and the electronic circuit parts in the cavity portion;

injecting resin into the cavity portion; and removing the resin bound optical module from the mold die.

2. A method of manufacturing an optical module having an optical connector including an optical operation element, electronic circuit parts, and at least one lead pin comprising the steps of:

placing the optical connector, electronic circuit parts, and at least one lead pin in a mold die, the mold die comprising:

a cavity portion for holding the optical connector, electronic circuit parts, and at least one lead pin so as to form a package;

an alignment portion having a channel for aligning the optical connector, the channel having a longitudinal positioning means engaging the optical connector to prevent the optical connector from moving in a longitudinal direction thereof; and a partition plate disposed between the cavity portion and the alignment portion to prevent resin from flowing out from the cavity portion to the alignment portion;

holding a portion of the optical connector in the channel;

holding a portion of the at least one lead pin and the electronic circuit parts in the cavity portion;

injecting resin into the cavity portion; and removing the resin bound optical module from the mold die.

3. A method of manufacturing an optical module as claimed in claim 2, wherein said partition plate has a semicircular notched portion formed with a radius of curvature slightly larger than an outside radius of said optical connector.

4. A method of manufacturing an optical module as claimed in claim 2, wherein said longitudinal positioning means comprises a pin member urged toward said optical connector so as to engage a receiving portion in the optical connector.

5. A method of manufacturing an optical module having an optical connector including an optical operation element, electronic circuit parts, and at least one lead pin comprising the steps of:

placing the optical connector, electronic circuit parts, and at least one lead pin in a mold die, the mold die comprising:

a cavity portion for holding the optical connector, electronic circuit parts, and at least one lead pin so as to form a package;

an alignment portion having a channel for aligning the optical connector, the channel having an angular positioning means engaging the optical connector to prevent the optical connector from moving within the channel in a direction perpendicular to a longitudinal direction thereof; and a partition plate disposed between the cavity portion and the alignment portion to prevent resin from flowing out from the cavity portion to the alignment portion;

holding a portion of the optical connector in the channel;

holding a portion of the at least one lead pin and the electronic circuit parts in the cavity portion;

injecting resin into the cavity portion; and removing the resin bound optical module from the mold die.

6. A method of manufacturing an optical module as claimed in claim 5, wherein said mold die further includes a retracting mechanism for retracting the angular positioning means after the resin molding.

7. A method of manufacturing an optical module as claimed in claim 5, wherein the angular positioning means is a pin member pressing against the optical connector.

8. A method of manufacturing an optical module having an optical connector including an optical operation element, electronic circuit parts, and at least one lead pin comprising the steps of:

placing the optical connector, electronic circuit parts, and at least one lead pin a mold die, the mold die comprising:

a cavity portion for holding the optical connector, electronic circuit parts, and at least one lead pin so as to form a package;

an alignment portion having a channel for aligning the optical connector, the channel having a longitudinal position means engaging the optical connector to prevent the optical connector from moving in a longitudinal direction thereof and an angular position means engaging the optical connector to prevent the optical connector for moving within the channel in a direction perpendicular to a longitudinal direction thereof; and a partition plate disposed between the cavity portion and the alignment portion to prevent resin from flowing out from the cavity portion to the alignment portion;

holding a portion of the optical connector in the channel;

holding a portion of the at least one lead pin and the electronic circuit parts in the cavity portion;

injecting resin into the cavity portion; and removing the resin bound optical module from the mold die.

* * * * *